Patented Oct. 20, 1931

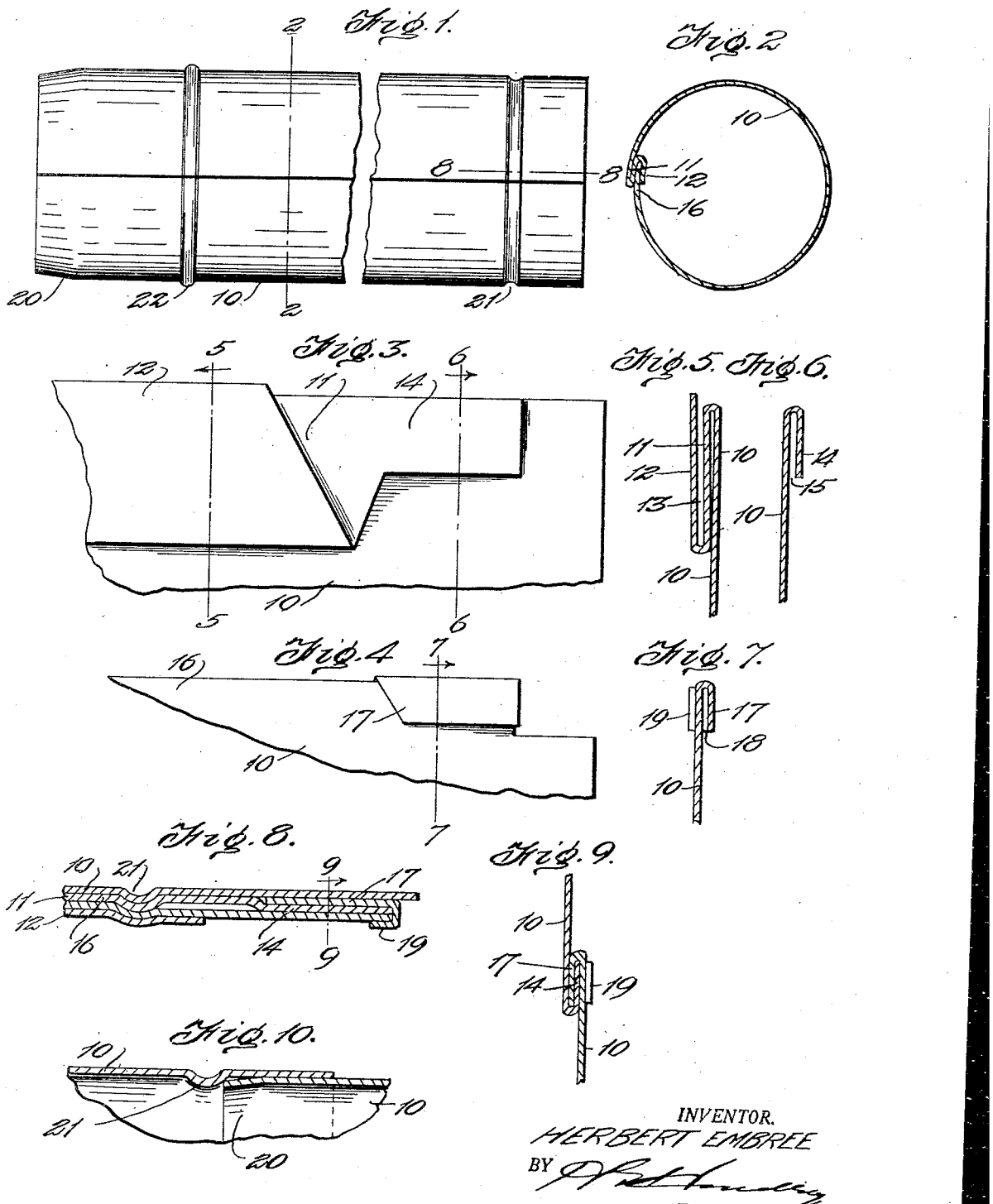

1,828,105

UNITED STATES PATENT OFFICE

HERBERT EMBREE, OF HAMILTON, ONTARIO, CANADA

STOVE PIPE

Application filed July 11, 1930. Serial No. 467,207.

This invention relates to sheet metal piping such as stove pipes and the like and has special reference to that type of stove pipe which is formed from a single sheet of metal rolled into pipe form and having its meeting edges connected together.

In the ordinary construction of such pipes the meeting edges of the pipe are fixed together, by some means such as welding, rivetting, by rolling a seam or joint or the like at the factory or shop. Pipes made in this way cannot be nested and consequently take up much room in transportation though weighing little in proportion to the space occupied. This is objectionable and expensive in shipping since railroads and other common carriers have high rates per pound for articles in which the poundage is small and the space occupied large.

The principal object of the present invention is to provide a novel seam or joint for the meeting edges of such pipe sheets, this joint being so arranged that, without tools of any kind, these meeting edges may be locked securely together for use of the pipe or may be released so that the sheets may be allowed to spring open and can thus be nested one inside of the other so that a number of such pipe sections may be packed in a box but little larger than that required to hold one section with the edges joined.

Another object of the invention is the formation of a novel joint or seam which will hold securely under conditions of use but which, if desired, may be readily separated.

A third object of the invention is to provide a novel end construction for such pipes so that they may be easily connected end to end.

With the above and other objects in view, as will be presently understood, the invention consists in general of certain novel features of construction and combinations of parts hereinafter fully described, illustrated in the accompanying drawings and specifically claimed.

In the accompanying drawings like characters of reference indicate like parts in the several views, and:

Figure 1 is a side elevation of a section of pipe constructed in accordance with this invention.

Figure 2 is a section on the line 2—2 of Figure 1.

Figure 3 is an enlarged view showing a portion of one meeting edge of the sheet from the inside thereof.

Figure 4 is a similar view of a portion of the other meeting edge.

Figure 5 is a section on the line 5—5 of Figure 3.

Figure 6 is a section on the line 6—6 of Figure 3.

Figure 7 is a section on the line 7—7 of Figure 4.

Figure 8 is an enlarged section on the line 8—8 of Figure 1.

Figure 9 is a section on the line 9—9 of Figure 8.

Figure 10 is a section showing the joint connecting the ends of adjacent sections.

This pipe is formed as usual of a single sheet of suitable metal rolled up to bring two of its edges in approximation, the body of this sheet being shown at 10.

One of these meeting edges is folded back inwardly to lie for the greater portion of its length flat against the inner surface of the body as shown at 11 and is then folded inwardly and forwardly as at 12 to lie in slightly spaced relation to the portion 11. A flattened S-bend is thus formed at this edge to provide a channel 13 opening toward the opposed edge. At one end the portions 11 and 12 are cut away so that this channel 13 terminates short of this end of the pipe but part of the width, about half the depth of the channel, of the portion 11 at this end is continued in spaced relation to the part 10 as at 14 to form an inwardly opening channel 15.

The opposed edge is straight for the greater portion of its length as at 16 so that this portion may fit in the channel 13 but opposite the portion 14 a tab 17 is provided which is bent back outwardly of the body to provide an inwardly opening channel 18 so that, when assembled, the portion 17 hooks into the channel 15 and the portion 14 hooks into the channel 18. This portion 17 preferably is cut away from the body for a short distance from the end of the body so as to form a tab 19 which is folded back to engage over the adjacent outer side of the body 10 and thus hold the portion or lip 17 from springing open.

One end of the body is rolled or pressed to form a smooth taper 20 adapted to fit in the opposite end of a connected joint, this opposite end being provided with an internal bead 21 against which this tapered end abuts when two sections of pipe are assembled. An external bead 22 is provided near the tapered position.

In connecting the edges the edge 16 at the end provided with the tab 17 is inserted in the channel 13 and pressed in far enough to permit the portions 14 and 17 to slide clear of each other so that these portions will, upon relaxation of pressure on the pipe, interlock and thus hold this end in shape. At the other end the edge 16 is held in the channel 13 by insertion of that end in the opposite end of an adjoining pipe section.

While the tab 17 is here shown as held by the portion 19 it is to be understood that this tab may be held by other means as by spot welding, rivetting or any other suitable means.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

A sheet metal pipe formed from a single sheet of metal bent to bring its longitudinal edges together, one of said edges being provided with an outwardly facing channel for the greater part of its length and with a short inwardly facing channel adjacent one end, the other longitudinal edge having a short inwardly facing channel opposed to the inwardly facing channel of the first edge, said inwardly facing channels each having a side adapted to enter the opposed channel, the side of the second short channel being cut away at one end and bent under the body of the pipe to secure the side of the second channel against springing open.

In testimony whereof he has affixed his signature.

HERBERT EMBREE.